US006912396B2

(12) United States Patent
Sziraki et al.

(10) Patent No.: US 6,912,396 B2
(45) Date of Patent: Jun. 28, 2005

(54) VEHICLE TELEMATICS RADIO OPERABLE FOR PROVIDING AND DISABLING DRIVING DIRECTIONS TO PRE-SELECTED DESTINATIONS

(75) Inventors: David Sziraki, Plymouth, MI (US); Xiaopei Huang, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 628 days.

(21) Appl. No.: 10/015,261

(22) Filed: Dec. 12, 2001

(65) Prior Publication Data

US 2003/0109263 A1 Jun. 12, 2003

(51) Int. Cl.⁷ ............................................... H04Q 7/20
(52) U.S. Cl. ................. 455/456.1; 455/457; 455/426.2; 455/456.2; 455/456.3
(58) Field of Search .......................... 455/414.2, 404.2, 455/514, 161.2, 433, 456.1, 456.2, 456.3, 457, 404.1, 426.2, 521; 342/357.1, 357.13, 457; 701/208, 211, 210; 340/426.17

(56) References Cited

U.S. PATENT DOCUMENTS

| | | | | |
|---|---|---|---|---|
| 5,276,728 A | * | 1/1994 | Pagliaroli et al. | 455/404.1 |
| 5,448,218 A | * | 9/1995 | Espinosa | 340/426.17 |
| 5,673,305 A | * | 9/1997 | Ross | 455/517 |
| 5,677,837 A | * | 10/1997 | Reynolds | 455/456.3 |
| 5,935,193 A | * | 8/1999 | Saiki | 701/211 |
| 5,983,158 A | * | 11/1999 | Suzuki et al. | 701/209 |
| 6,028,537 A | * | 2/2000 | Suman et al. | 340/988 |
| 6,041,280 A | * | 3/2000 | Kohli et al. | 701/201 |
| 6,115,611 A | * | 9/2000 | Kimoto et al. | 455/456.3 |
| 6,198,919 B1 | | 3/2001 | Buytaert et al. | |
| 6,236,365 B1 | * | 5/2001 | LeBlanc et al. | 342/457 |
| 6,282,491 B1 | | 8/2001 | Bochmann et al. | |
| 6,351,709 B2 | * | 2/2002 | King et al. | 701/210 |
| 6,477,462 B1 | * | 11/2002 | Rychlak | 701/210 |
| 6,535,743 B1 | * | 3/2003 | Kennedy et al. | 455/456.1 |
| 6,553,308 B1 | * | 4/2003 | Uhlmann et al. | 701/208 |
| 6,680,674 B1 | * | 1/2004 | Park | 340/905 |
| 6,707,421 B1 | * | 3/2004 | Drury et al. | 342/357.1 |
| 6,731,940 B1 | * | 5/2004 | Nagendran | 455/456.1 |

* cited by examiner

*Primary Examiner*—William Trost
*Assistant Examiner*—Kiet Doan
(74) *Attorney, Agent, or Firm*—Brinks Hofer Gilson & Lione

(57) ABSTRACT

A vehicle telematics radio operable for providing and disabling driving directions to pre-selected destinations includes a receiver, memory, a processor, and an interface. The memory stores the location of at least one pre-selected destination. The interface receives a request from a vehicle operator for the driving directions to a desired pre-selected destination. The receiver receives a position signal indicative of the current location of the vehicle. The processor determines the driving directions from the current location of the vehicle to the pre-selected destination based on the position signal and map information. The interface then provides the operator with the driving directions to the desired pre-selected destination. In special situations such as when either the vehicle or telematics radio is stolen or missing, the telematics radio may be disabled from providing driving directions in response to receiving a deactivation signal.

12 Claims, 2 Drawing Sheets

VEHICLE TELEMATICS RADIO OPERABLE FOR PROVIDING AND DISABLING DRIVING DIRECTIONS TO PRE-SELECTED DESTINATIONS

BACKGROUND OF THE INVENTION

1. Field of the Invention

The present invention relates generally to vehicle telematics radios and, more particularly, to a vehicle telematics radio operable for providing and disabling driving directions to pre-selected destinations.

2. Background Art

Telematics is the use of computer systems in concert with telecommunication systems. Automotive vehicles can include telematics radios which combine wireless phone, on-board autonomous navigation, off-board navigation, and audio functions for a vehicle operator.

A vehicle telematics radio performs on-board autonomous or off-board navigation in order to provide the vehicle operator with driving directions or a navigational route to a desired destination. For instance, the operator may want driving directions to a desired destination in a city. The operator requests the driving directions from the telematics radio by inputting the address of the desired destination into the telematics radio. The telematics radio then communicates with a global positioning satellite to receive a position signal indicative of the current position of the vehicle. The telematics radio then accesses a database containing a map of the city and determines the driving directions to the desired destination. The telematics radio then provides the driving directions to the operator.

The telematics radio communicates with the global positioning satellite to update the driving directions to the desired destination as the operator drives the vehicle. The telematics radio may also access vehicle speed detectors and vehicle gyroscopes/compasses while the vehicle is being driven to further determine the driving directions.

A problem with typical telematics radios is that it is tedious for the operator to input the address of a desired destination into the telematics radio each time the operator wants driving directions.

SUMMARY OF THE INVENTION

Accordingly, it is an object of the present invention to provide a vehicle telematics radio operable for providing and disabling driving directions to pre-selected destinations.

In carrying out the above object and other objects, the present invention provides a telematics radio for providing driving directions to an operator of a vehicle. The telematics radio includes a receiver, memory, a processor, and an interface. The receiver is operable for receiving a position signal indicative of the current location of the vehicle. The memory is operable for storing the location of at least one pre-selected destination. The processor is operable for determining driving directions from the current location of the vehicle to each pre-selected destination based on the position signal and map information from a map database. The interface is operable for receiving a request from the operator for the driving directions to a desired pre-selected destination. The interface is further operable for providing the operator with the driving directions to the desired pre-selected destination as determined by the processor. The interface may be further operable to be disabled from providing driving directions in response to receiving an interface deactivation signal.

Further, in carrying out the above object and other objects, the present invention provides a method for providing driving directions to an operator of a vehicle. The method includes storing the location of at least one pre-selected destination; receiving a request from the operator for the driving directions to a desired pre-selected destination; receiving a position signal indicative of the current location of the vehicle; determining driving directions from the current location of the vehicle to the desired pre-selected destination based on the position signal and map information; and then providing the operator with the driving directions to the desired pre-selected destination. The method may further include disabling the step of providing the operator with the driving directions in response to a deactivation signal being received.

The advantages associated with the present invention are numerous. For instance, the present invention allows a vehicle operator to pre-select destinations and then obtain the driving directions for a desired pre-selected destination by simply pushing a button associated with the desired pre-selected destination instead of entering the address of the desired destination. Further, the present invention disables driving directions from being provided to a vehicle operator in special situations such as the vehicle or telematics radio being stolen or reported missing. Accordingly, the present invention prevents unauthorized access from a telematics radio of driving directions to the vehicle owner's home or other pre-selected destinations.

DETAILED DESCRIPTION OF THE PREFERRED EMBODIMENT(S)

Figure 1:
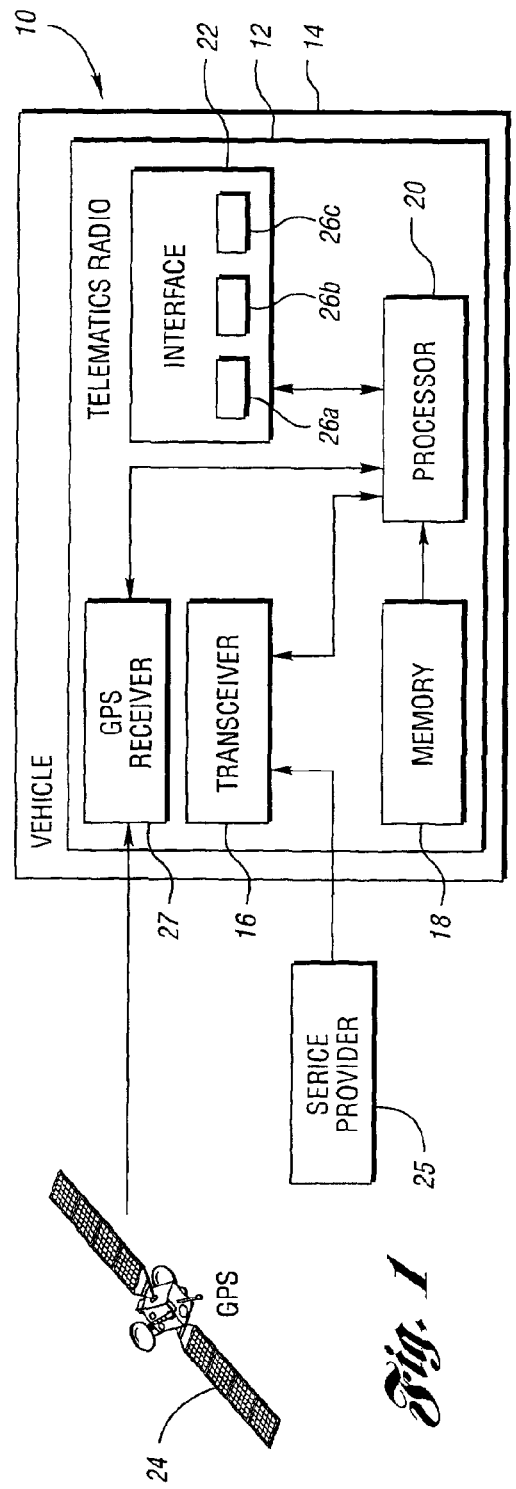
FIG. 1 illustrates a block diagram of a system in accordance with the present invention.

Referring now to FIG. 1, a block diagram of a system 10 in accordance with the present invention is shown. System 10 includes a telematics radio 12 located within a vehicle 14. An operator of vehicle 14 uses telematics radio 12 for on-board autonomous navigation or off-board navigation in order to obtain driving directions to a desired destination.

Telematics radio 12 includes a transceiver 16, memory 18, a processor 20, an interface 22, and a global positioning satellite receiver 27. Transceiver 16 is operable for wirelessly receiving signals from an outside source such as a wireless service provider 25. Global positioning satellite receiver 27 is operable for wirelessly receiving signals from another outside source such as a global positioning satellite 24. Memory 18 is operable for storing information such as address information of frequent destinations. Processor 20 is operable for determining driving directions to a desired destination based on the current position of the vehicle and map information. Interface 22 is operable for communicating information between the operator and the components of telematics radio 12 and for visually displaying and/or audibly announcing driving directions to the operator of the vehicle.

In order to perform on-board autonomous navigation, the operator enters the address of a desired destination into interface 22. Global positioning satellite receiver 27 then communicates with global positioning satellite 24 to receive a position signal indicative of the current position of vehicle 14. Global positioning satellite receiver 27 then provides the position signal to processor 20. Processor 20 then determines the current position of vehicle 14 based on the position signal. Processor 20 then accesses a map database such as contained on a compact disk inserted into interface 22 in order to obtain map information during on-board autonomous navigation. For off-board navigation, processor 20 receives the map information from service provider 25 wirelessly communicating with transceiver 16.

Processor 20 uses the position signal to locate the current position of vehicle 14 on an appropriate map and uses the address of the desired destination to locate the desired destination on the map. Processor 20 then uses the map to determine the driving directions between vehicle 14 and the desired destination. Processor 20 then provides the driving directions to interface 22 which then communicates the driving directions to the operator of vehicle 14.

The operator of vehicle 14 may then use the driving directions to drive the vehicle towards the desired destination. As the operator drives vehicle 14, global positioning satellite receiver 27 receives updated vehicle position signals from global positioning satellite 24. Processor 20 uses the updated vehicle position signals to update the driving directions and monitor compliance with the driving directions. Interface 22 then displays the updated driving directions to the operator of vehicle 14. Telematics radio 12 may also be operable with vehicle speed detectors and vehicle gyroscopes or compasses to enhance the position information obtained from global positioning satellite 24.

In order to avoid having the operator manually enter an address of a desired destination each time driving directions to the desired destination are needed, interface 22 includes a plurality of pre-set buttons 26. The operator may associate the addresses of pre-selected destinations with each pre-set button 26. Memory 18 stores the addresses of the pre-selected destinations associated with each pre-set button 26. For instance, pre-set buttons 26 may include a HOME button 26a, a business button 26b, a school button 26c, etc. Interface 22 and memory 18 are operable to allow the operator to associate the addresses of the vehicle owner's home, business, school with HOME button 26a, business button 26b, school button 26c, respectively. Memory 18 then stores the address and associated pre-set button pair information. As a result, the operator need only press pre-set button 26 corresponding to the desired destination instead of manually entering the address of the desired destination each time driving directions are needed to the desired destination.

For example, once the address of the vehicle owner's home is associated with HOME button 26a and stored in memory 18, the operator may press the HOME button to obtain driving directions to the vehicle owner's home instead of manually entering the address of the owner's home. In response to the operator pressing HOME button 26a, telematics radio 12 functions to obtain and display driving directions to the vehicle owner's home and updates the driving directions as the operator drives vehicle 14 in accordance with the procedure described above.

Figure 2:
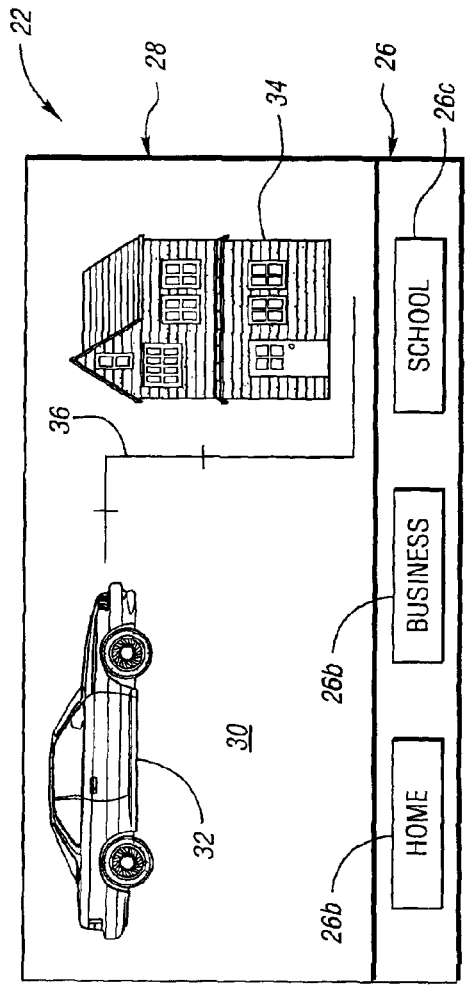
FIG. 2 illustrates a block diagram of an interface of a telematics radio of the system shown in FIG. 1.

Referring now to FIG. 2, with continual reference to FIG. 1, a block diagram of interface 22 is shown. Interface 22 includes a display 28 for displaying information to the operator of vehicle 14. Upon the operator pressing one of pre-set buttons 26 such as HOME button 26a, telematics radio 12 obtains the driving directions to the address of the vehicle owner's home associated with the HOME button. Interface 22 then displays the driving directions on display 28. For instance, as shown in FIG. 2, display 28 displays a street layout 30 showing the relative location 32 of vehicle 14 and the location 34 of the vehicle owner's home. Street layout 30 also includes a suggested route 36 between vehicle 14 and the location 34 of the vehicle owner's home.

Sometimes it is desirable to prevent the operator of vehicle 14 from obtaining the driving directions to the vehicle owner's home or any other pre-selected destinations stored in memory 18. For instance, in cases where the operator of vehicle 14 is an unauthorized operator such as when the operator is a thief or when telematics radio 12 has been stolen or removed from vehicle 14.

In these cases, telematics radio 12 is further operable for deactivating the driving direction functions upon receiving a deactivation signal. Upon receiving a deactivation signal, telematics radio 12 prevents interface 22 from providing the operator with any driving directions and/or prevents the interface from providing the operator with driving directions to the pre-selected destinations associated pre-set buttons 26. Telematics radio 12 may also prevent interface 22 from receiving a request for driving directions from the operator upon receiving a deactivation signal.

Telematics radio 12 may receive a deactivation signal in numerous ways. For instance, upon the vehicle owner determining that vehicle 14 is stolen or missing, the vehicle owner may notify service provider 25. Service provider 25 then wirelessly transmits a deactivation signal to transceiver 16 of telematics radio 12. Transceiver 16 then provides the deactivation signal to processor 20. Processor 20 then disables interface 22 from receiving driving direction requests from the operator and/or providing any driving directions to the operator of vehicle 14. Processor 20 may also disable interface 22 from providing driving directions to a pre-selected destination in response to a pre-set button 26 being pressed. In order to disable driving directions to pre-selected destinations, processor 20 may set an internal flag in memory 18 to disable interface 22 from receiving and/or providing driving directions to a pre-selected destination in response to a pre-set button 26 being pressed.

Telematics radio 12 is also operable to detect abnormal conditions and disable the driving direction functions in response to an abnormal condition. Such abnormal conditions include a vehicle anti-theft device being actuated. Other abnormal conditions include interruption of power to the telematics radio 12 such as when occurs when the telematics radio is being removed without authorization from vehicle 14. In either case, telematics radio 12 generates a deactivation signal upon detection of an abnormal condition and then processor disables interface 22.

Figure 3:
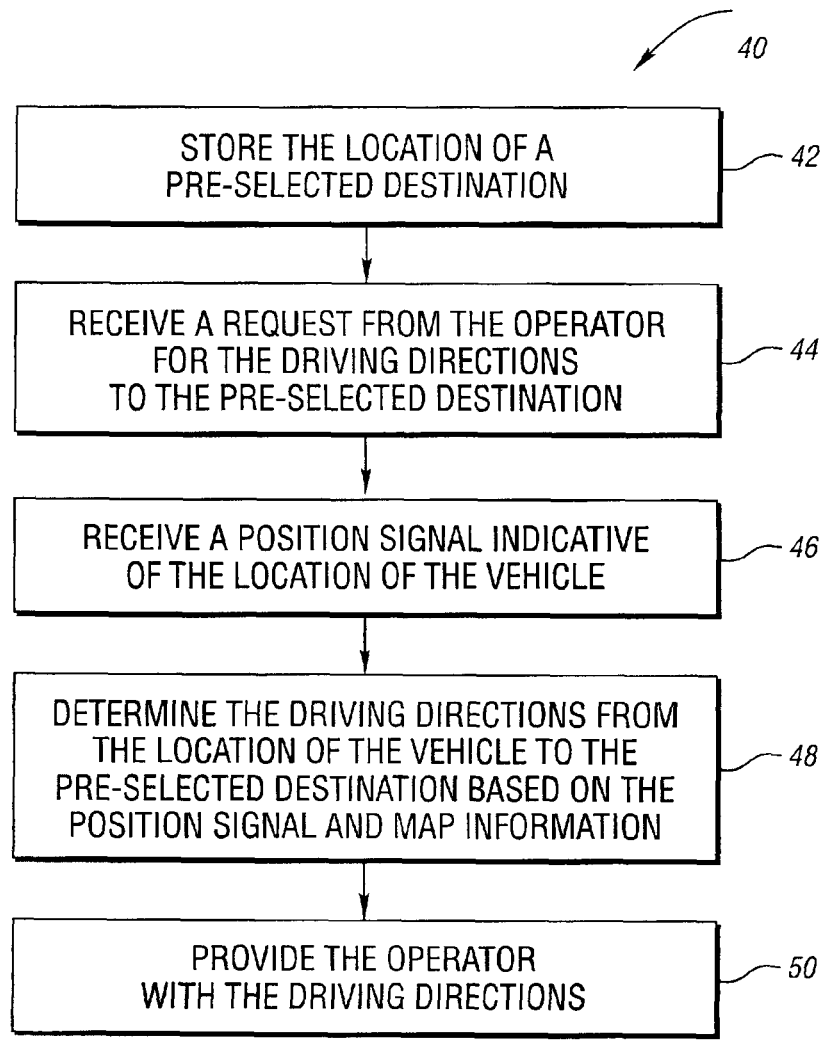
FIG. 3 illustrates a flow chart describing normal operation of the telematics radio of the system shown in FIG. 1 for providing driving directions.

Referring now to FIG. 3, a flow chart 40 describing normal operation of telematics radio 12 is shown. Flow chart 40 begins with memory 18 storing the location of at least one pre-selected destination as shown in block 42. Interface 22 receives a request from the operator for the driving directions to a desired pre-selected destination as shown in block 44. Global positioning satellite receiver 27 then receives a position signal indicative of the current location of vehicle 14 as shown in block 46. Processor 20 then determines the current location of vehicle 14 based on at least one of the position signal, map information, vehicle speed information, and gyroscope/compass information. Processor 20 then determines the driving directions from the current location of vehicle 14 to the desired pre-selected destination based on the position signal and a map database as shown in block 48. Interface 22 then provides the operator with the driving directions to the desired pre-selected destination as shown in block 50. Blocks 42, 44, 46, 48, and 50 of flow chart 40 describe normal operation of telematics radio 12.

Figure 4:
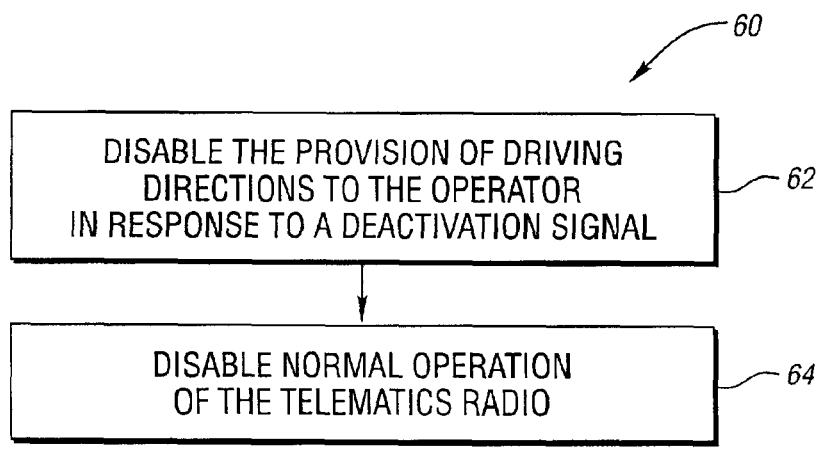
FIG. 4 illustrates a flow chart describing special operation of the telematics radio of the system shown in FIG. 1 for disabling driving directions.

In accordance with the present invention, telematics radio 12 may be deactivated in special situations as described above to prevent driving directions from being provided. Referring now to FIG. 4, a flow chart 60 describing operation of telematics radio 12 in the special situations is shown. In the special situations, processor 20 disables interface 22 from providing driving directions to the operator in response to a deactivation signal being received as shown in block 62. The deactivation signal may be received from service provider 25 or generated in response to an abnormal condition being detected such as an anti-theft device being triggered or telematics radio 12 being removed from vehicle 14. As a result of interface 22 being disabled, the normal operation of telematics radio 12 is disabled as shown in block 64.

Thus it is apparent that there has been provided, in accordance with the present invention, a vehicle telematics radio operable for providing and disabling driving directions to pre-selected destinations that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives.

What is claimed:

1. A telematics radio for providing driving directions to an operator of a vehicle, the telematics radio comprising:
   a receiver operable for receiving a position signal indicative of the current location of the vehicle;
   memory operable for storing the location of at least one pre-selected destination;
   a processor operable with the receiver and the memory for determining driving directions from the current location of the vehicle to each pre-selected destination based on the position signal and map information; and
   an interface operable for receiving a request from the operator for the driving directions to a desired pre-selected destination, the interface is further operable with the processor for providing the operator with the driving directions to the desired pre-selected destination;
   wherein the interface includes at least one button and is operable with the memory for associating pre-selected destinations with respective ones of the at least one button, wherein the interface receives a request from the operator for the driving directions to a desired pre-selected destination in response to the operator pressing the button associated with the desired pre-selected destination;
   wherein, in response to receiving an interface deactivation signal, the interface is disabled from providing the operator with driving directions to the pre-selected destinations such that the interface ignores requests from the operator for the driving directions to the pre-selected destinations in response to the operator pressing the buttons associated with the pre-selected destinations.

2. A telematics radio for providing driving directions to an operator of a vehicle, the telematics radio comprising:
   a receiver for receiving a position signal indicative of the current location of the vehicle;
   memory for storing the location of a home address of an owner of the vehicle;
   a processor operable with the receiver and the memory for determining driving directions from the current location of the vehicle to the home address of the vehicle owner based on the position signal and map information; and
   an interface for receiving a request from an operator for the driving directions to the home address of the vehicle owner, the interface is operable with the processor for providing the operator with the driving directions to the home address of the vehicle owner;
   wherein the interface includes a HOME button, wherein the interface is operable with the memory for associating the HOME button with the home address of the vehicle owner, wherein the interface receives a request from the operator for the driving directions to the home address of the vehicle owner in response to the operator pressing the HOME button;
   wherein, in response to receiving an interface deactivation signal, the interface is disabled from providing the operator with driving directions to the pre-selected destinations such that the interface ignores a request for the driving directions to the home address of the vehicle owner in response to the HOME button being pressed.

3. The telematics radio of claim 1 wherein:
   the interface is further operable to be disabled from providing driving directions in response to receiving the interface deactivation signal from the receiver.

4. The telematics radio of claim 3 wherein:
   the receiver is operable for wirelessly receiving the interface deactivation signal from a service provider and then providing the interface deactivation signal to the interface.

5. The telematics radio of claim 3 wherein:
   the receiver is operable for wirelessly receiving the interface deactivation signal directly from an owner of the vehicle and then providing the interface deactivation signal to the interface.

6. The telematics radio of claim 1 wherein:
   the interface is operable for receiving the interface deactivation signal in response to a vehicle anti-theft mechanism being triggered.

7. The telematics radio of claim 1 wherein:
   the interface is operable for receiving the interface deactivation signal in response to an anti-theft mechanism of the telematics radio being automatically triggered.

8. A method for providing driving directions to an operator of a vehicle, the method comprising:
   storing the location of at least one pre-selected destination;
   associating the pre-selected destinations with respective buttons;
   receiving a request at an interface from the operator for the driving directions to a desired pre-selected destination in response to the operator pressing the button associated with the desired pre-selected destination;
   receiving a position signal indicative of the current location of the vehicle;
   determining driving directions from the current location of the vehicle to the location of the desired pre-selected destination based on the position signal, the stored location of the desired pre-selected destination, and map information;

the interface providing the operator with the driving directions to the desired pre-selected destination; and disabling the interface from providing the operator with driving directions to the pre-selected destinations in response to a deactivation signal being received at the interface such that the interface ignores requests from the operator for the driving directions to the pre-selected destinations in response to the operator pressing the buttons associated with the pre-selected destinations.

9. The method of claim 8 wherein:

associating the pre-selected destinations with respective buttons includes associating a HOME button with a home address of the operator.

10. The method of claim 8 wherein:

disabling includes disabling the interface from providing the operator with the driving directions in response to a deactivation signal being wirelessly received by the interface from a service provider.

11. The method of claim 8 wherein:

disabling includes disabling the interface from providing the operator with the driving directions in response to a deactivation signal being wirelessly received by the interface from an owner of the vehicle.

12. The method of claim 8 wherein:

disabling includes disabling the interface from providing the operator with the driving directions in response to the interface receiving a deactivation signal generated in response to a vehicle anti-theft mechanism being triggered.

* * * * *